United States Patent Office 3,039,992
Patented June 19, 1962

3,039,992
ALKALINE EARTH SULFIDE IN CURING OF FLUOROCARBON ELASTOMER
John F. Smith, Brandywine Hundred, Del., assignor to E. I. du Pont de Nemours and Company, Wilmington, Del., a corporation of Delaware
No Drawing. Filed May 17, 1960, Ser. No. 29,586
7 Claims. (Cl. 260—45.7)

This invention relates to a process for curing fluorocarbon elastomers and more particularly to an improved process whereby vulcanizates are obtained which display improved resistance to hot mineral acids.

Fluorocarbon elastomers are especially valuable because of their thermal stability and their good resistance to a wide variety of solvents, oils, fuels and the like, particularly at high temperatures. Thus, their vulcanizates are being increasingly used in the manufacture of tubing employed as aircraft hose for carrying fuels, lubricants, and the like at high temperatures and pressures. Other valuable applications include the preparation of molded O-ring seals for hydraulic systems and diaphragms for control apparatus.

During the vulcanization process it is essential to include an acid acceptor as a co-curing agent. Heretofore magnesium oxide has been the preferred material for this purpose. Unfortunately vulcanizates containing magnesium oxide undergo marked swelling when they are exposed to hot mineral acids under some conditions.

It is an object of this invention to provide an improved process for curing fluorocarbon elastomers. A further object is to provide a process for obtaining cured fluorocarbon elastomers which display improved resistance to hot mineral acids. Other objects will appear hereinafter.

These and other objects of this invention are accomplished by the process of curing a fluorocarbon elastomer which comprises (1) incorporating into each 100 parts by weight of said fluorocarbon elastomer, (a) a curing agent selected from the group consisting of about 0.5 to 3.0 parts by weight of the carbamate of a 2 to 6 carbon atom alkylene diamine; about 0.5 to 3.0 parts by weight of an N,N'-diarylidene diamine of the formula

Ar—CH=N—R—N=CH—Ar wherein R is a saturated aliphatic or cycloaliphatic hydrocarbon radical of from 4 to 18 carbon atoms and Ar is an aromatic radical of the benzene series; and about 0.2 to 2.0 parts by weight of an organic dithiol in combination with about 0.2 to 1.0 part by weight of an aliphatic tertiary amine, and (b) from about 10 to 30 parts by weight of an inorganic sulfide selected from the group consisting of barium sulfide, calcium sulfide, and strontium sulfide; and (2) heating the mixture thereby obtained at 100° to 200° C. so as to effect a cure.

The fluorocarbon elastomers which may be cured according to the process of the present invention include (a) a vinylidene fluoride-hexafluoropropene copolymer containing from 30 to 70 percent by weight of vinylidene fluoride and from 70 to 30 percent by weight of hexafluoropropene and (b) a copolymer of vinylidene fluoride, hexafluoropropene and tetrafluoroethylene containing from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1.

In order that the copolymers of vinylidene fluoride and hexafluoropropene be elastomeric, it is necessary that they contain from about 30 to about 70 percent by weight of vinylidene fluoride units with a preferred elastomeric copolymer containing between about 53 and 70 percent by weight of vinylidene fluoride units. The copolymers of vinylidene fluoride and hexafluoropropene are described in "Industrial and Engineering Chemistry," vol. 49, p. 1687 (1957), French Patent 1,153,164, Italian Patent 553,285 and British patent specification 789,786.

The other elastomeric copolymers, which may be used, contain from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1. The weight ratio of vinylidene fluoride to hexafluoropropene corresponds to a range of 70 to 40 percent by weight of vinylidene fluoride and 30 to 60 percent by weight of hexafluoropropene monomer units. Within this ratio the copolymer is elastomeric. When the proportion of hexafluoropropene to vinylidene fluoride drops below about 30 percent the products are plastic rather than elastic. On the other hand, about 60 percent is the largest proportion of hexafluoropropene which yields a satisfactory elastic copolymer. In the same vein, the content of tetrafluoroethylene units should not exceed about 35 percent by weight of the total copolymer if the elastomeric properties of the copolymer are to be retained. A preferred range of composition for the copolymers used in the present invention consists of 15 to 25 percent by weight of tetrafluoroethylene units and 85 to 75 percent by weight of vinylidene fluoride and hexafluoropropene units, the vinylidene fluoride and hexafluoropropene units being present in a weight ratio within the range of 2.33:1.0 to 0.667:1.0.

These copolymers are made by copolymerization of a mixture of the monomers using well known polymerization conditions. Preferably the familiar aqueous redox polymerization system is used. Polymerization may be initiated by the use of the ammonium persulfate-sodium bisulfite system. Polymerization is normally accomplished under pressure at moderately elevated temperatures.

The curing agents which are used in the present invention include alkylene diamine carbamates, N,N'-diarylidene diamines and organic dithiol-aliphatic tertiary amine combinations. It is known to use these materials, in combination with certain metallic oxides, as curing agents for fluorocarbon elastomers. It has now been found that when these materials are used in combination with a selected group of metal sulfides, a surprising improvement in the stability of the vulcanizate toward hot mineral acids occurs. The sulfides which may be employed in the process of the present invention include barium sulfide, calcium sulfide and strontium sulfide. It is believed that these sulfides act as acid acceptors during the vulcanization. Fluorocarbon elastomer vulcanizates made by the present invention, when compared with conventional fluorocarbon elastomer vulcanizates utilizing magnesium oxide as an acid acceptor, display improved resistance to a wide variety of hot mineral acids such as hydrochloric acid, hydrobromic acid, hydroiodic acid, and sulfuric acid.

As mentioned above, the curing agents include alkylene diamine carbamates, organic dithiol-aliphatic tertiary amine combinations and N,N'-diarylidene diamines. The carbamates are derived from any 2 to 6 carbon atom alkylene diamine. Representative compounds include hexamethylene diamine carbamate and ethylene diamine carbamate.

The organic dithiols used in the dithiol-aliphatic tertiary amine combination include any aliphatic or aromatic dithiol. The critical feature as to these compounds is that they have two —SH groups each of which is attached to a different carbon atom. Representative compounds include dimercaptodimethylether

[HS—CH$_2$—O—CH$_2$SH]

mercaptoethylmercapto-n-butyl ether

[HS—(CH$_2$)$_2$—O—(CH$_2$)$_4$—SH]

thioethers such as dimercaptomethylsulfide

[HS—CH$_2$—S—CH$_2$—SH]

dimercaptodi-n-butylsulfide

[HS—(CH$_2$)$_4$—S—(CH$_2$)$_4$SH]

alkylene dithiols such as 1,2-ethanedithiol

[HS—CH$_2$CH$_2$—SH]

1,6-hexanedithiol

[HS—(CH$_2$)$_6$—SH]

esters such as ethylenebismercaptoacetate $$[HS-CH_2-\overset{O}{\underset{\|}{C}}-O-CH_2CH_2-O-\overset{O}{\underset{\|}{C}}-CH_2-SH]$$

hexamethylene - bis(ε-mercaptocaproate), di-2-mercaptoethyl adipate, and aromatic dithiols such as 1,5-naphthalenedithiol, 2,7-naphthalenedithiol, 4,4'-dimercaptodiphenyl. Ethylene-bis-mercaptoacetate, also called ethylene-bis-thioglycolate, is readily available commercially and is thus a preferred agent. These dithiol compounds are known compounds and may be prepared by known methods for making dithiols (see for example Wagner and Zook, Synthetic Organic Chemistry, Wiley, 1953). Their use, in conjunction with aliphatic tertiary amines, as curing agents in fluorocarbon elastomer technology is described in "Rubber World" 140, pp. 263–6 (1959).

The amine used in conjunction with the dithiol will be selected from the class of aliphatic and cycloaliphatic tertiary amines. The term "aliphatic" as used herein is intended to cover both of these types. Usually the aliphatic tertiary amine will be a di-lower alkyl-higher alkyl (or cycloalkyl) amine such as dimethyldodecylamine, dimethyltetradecylamine, diethylhexadecylamine, and methylethyloctadecylamine. Other amines such as dimethylcyclohexylamine, dimethyl - n - butylamine, triethylamine, and the like are also useful. The preferred amine is dimethyldodecylamine. If desired, the tertiary amines may be used in the form of their acid salts. This is preferred in the case of the more volatile tertiary amines.

The N,N'-diarylidene diamines may be represented by the formula

Ar—CH=N—R—N=CH—Ar wherein Ar is an aromatic radical of the benzene series, and R is a saturated aliphatic or cycloaliphatic hydrocarbon radical of from 4 to 18 carbon atoms. Representative radicals for Ar include phenyl, o-hydroxyphenyl, p-dimethylaminophenyl, o-diethylaminophenyl, m-tolyl, 3,5-xylyl, o-chlorophenyl, m-fluorophenyl, p-bromophenyl, and

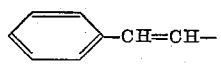

These compounds are produced in known manner by the reaction of an aromatic aldehyde at ordinary room temperature with an aliphatic or cycloaliphatic diamine. They are also produced by reacting a diarylidene-1,2-propylenediamine (or a diarylidene-ethylenediamine) with a C$_4$ to C$_{18}$ aliphatic or cycloaliphatic diamine or diamine carbamate at ordinary room temperature.

The following compounds are illustrative of the N,N'-diarylidene diamines which may be employed in the present invention.

N,N'-dibenzylidenetetramethylenediamine
N,N'-dibenzylidenehexamethylenediamine
N,N'-disalicylidenehexamethylenediamine
N,N'-disalicylidenedecamethylenediamine
N,N'-di(p-dimethylaminobenzylidene)hexadecamethylenediamine
N,N'-di(o-diethylaminobenzylidene)octadecamethylenediamine
N,N'-dibenzylidenecyclohexane-1,3-diamine
N,N'-dibenzylidene(4,4'-dicyclohexylmethane-4,4'-diamine)
N,N'-dicinnamylidenehexamethylenediamine and the like. N,N'-dicinnamylidenehexamethylenediamine is preferred.

The curing agents of this invention are incorporated into the fluorocarbon elastomer by conventional methods such as by milling in heavy-duty mixers or on the usual rubber milling equipment. Additions may be in any order desired. Ordinarily water-cooled milling equipment will be used so that curing or cross-linking temperatures are not reached. When the alkylene diamine carbamate or the N,N'-diarylidene diamine is the curing agent, about 0.5 to 3.0 parts (1.0 to 2.0 parts is preferred) by weight are employed for every 100 parts by weight of the fluorocarbon elastomer. The dithiol-tertiary amine combination should contain from about 0.2 to 2.0 parts by weight of dithiol and from about 0.2 to 1.0 part by weight of the tertiary amine per 100 parts by weight of elastomer.

About 10 to 30 parts by weight of the metal sulfide are used for every 100 parts by weight of the fluorocarbon elastomer. The vulcanizate is undercured when less than the minimum concentrations of curing agent or metal sulfide are used; it becomes brittle and overcured when more than the maximum amount of the curing agent is present; a stiff stock results when more than 30 parts of the sulfide is supplied.

Fillers and reinforcing agents, such as carbon blacks and the known wide variety of mineral fillers, may be employed in varying quantities such as from 10 to 60 parts, depending upon the degree of hardness, heat resistance and stability desired in the cured product. The carbon blacks may be those normally used in elastomers, such as thermal, furnace and channel blacks. Mineral fillers including the fine silicas, clays and diatomaceous earth, may be used. Alkaline fillers such as alkaline carbon blacks and silicas are preferred. Pigments may be incorporated for color effects.

After the fluorocarbon elastomer has been completely compounded, the stock obtained is cured by heating. In general, temperatures between about 100° C. and 200° C. are used. In order to reach as complete a state of cure as possible, it is recommended that at least the final portion of the curing cycle be carried out in an open oven at about 200° C. Thin films (e.g. 0.1 inch in thickness) or small articles from which water vapor and other gaseous by-products of the cure can escape can be vulcanized directly this way. However, larger articles of thicker cross-section need a preliminary curing cycle under compression in a mold to develop sufficient cross-links within them to prevent rupture and sponging from occurring when they are heated in an open oven. Accordingly, the cure is quite frequently carried out in two stages: the first, a press cure of about 5 to 60 minutes at 100–150° C.; the second, a subsequent oven cure at about 200° C.

for at least 10 hours. The articles are held in the press for as long a time as is necessary to develop sufficient cross-links to prevent rupture and sponging on subsequent heating in an open oven. The time required for this operation will depend upon the size and thickness of the article involved. Those skilled in the art can readily determine the optimum conditions for a particular article. In general, it is preferred to press cure at 150° C. for 5 to 60 minutes. For the oven cycle 18 to 20 hours is preferred. When a period shorter than 18 hours is employed, the compression set of the vulcanizate leaves something to be desired and after-curing during high temperature-use may occur. Extension of oven curing beyond 20 hours is unnecessary and uneconomical.

The following examples will better illustrate the nature of the present invention; however, the invention is not intended to be limited to thesse examples. Parts are by weight unless otherwise indicated.

The physical properties of the vulcanizates were measured as follows:

Property:                          ASTM Test Method
  $M_{100}$, $M_{200}$, $T_B$, $E_B$ -------- D412–51T.

Compression Set ----------- D395–55, Method B.

DESCRIPTION OF COPOLYMERS

A. *Vinylidene Fluoride* ($VF_2$)/*Tetrafluoropropene* (HFP) *Copolymer*

Copolymer A is a 60/40 weight percent copolymer of $VF_2$ and HFP. It has an inherent viscosity (0.1 g. copolymer in 100 cc. of an 87/13 weight percent tetrahydrofuran (THF)/dimethylformamide (DMF) mixture at 30° C.) of 0.95±0.05, a Mooney viscosity (ML 10 at 100° C.) of 75±6 and a number-average molecular weight of about 100,000.

The general procedure for preparation of copolymers of this type is given in "Industrial and Engineering Chemistry" 49, 1687 (1957).

B. $VF_2$/HFP/*Tetrafluoroethylene* (TFE) *Copolymer*

Copolymer B is a 45/30/25 weight percent copolymer of $VF_2$/HFP/TFE having an inherent viscosity (0.1 g. copolymer in 100 cc. of an 87/13 weight percent THF/DMF mixture) of 0.95±0.05. The composition was established by nuclear magnetic resonance spectroscopy.

Copolymer B was prepared according to the following continuous process:

Gaseous vinylidene fluoride, hexafluoropropene and tetrafluoroethylene were measured through rotameters and then mixed in a pipe line. The mixed gases were compressed to approximately 900 lbs. sq. in. and led through a heated line (to prevent condensation) to the reactor which was a Type 316 stainless steel agitated autoclave having a capacity of 10 gallons. The catalyst solution was introduced into the autoclave through a separate line. The autoclave was operated liquid full and had a take-off line in the lid. The normal reaction temperature was 100±2° C. and the agitator operated at 230 r.p.m. The overflow from the autoclave passed through a pressure reducer which released the polymerization mass at atmospheric pressure. The emulsion was then broken and the aqueous catalyst phase was discarded. The copolymer was isolated as a wet crumb which could be dried by sheeting it out on a cold chrome-plated rubber mill and then heating the mill to 100° C.

In the continuous method described, the proportions of reactants shown in the following table were used.

Feed composition, wt. percent:
  Vinylidene fluoride ---------------------------- 45
  Hexafluoropropene ---------------------------- 32
  Tetrafluoroethylene ---------------------------- 23

The catalyst consisted of an aqueous solution containing 1200 g. ammonium persulfate and 240 g. sodium bisulfite in 440 lbs. of deoxygenated water. The average feed rate of gases was 42.6 lbs. per hour and the catalyst solution was added at a rate of 83 lbs per hour. The amount of off-gas from the reactor was negligible, accounting for the similarity between the composition of the feed gases and the composition of the polymer as determined by nuclear magnetic resonance measurements.

EXAMPLE 1

Four stocks (1A–1D) were compounded on a rubber roll mill according to the recipes given in Table I. The stocks obtained were heated in 3 x 6 x ¼" molds under pressure at 150° C. for one hour. They were then removed from the molds and placed in a circulating air oven at 200° C. for 18 hours. The vulcanizates obtained were aged 3 days at 70° C. in 36% hydrochloric acid. Table I below shows that the stocks cured with the sulfides were much less swollen than was the stock 1A cured with magnesium oxide. There was also a much better retention of original tensile strength and elongation at the break.

Table I

| | Stock 1A | Stock 1B | Stock 1C | Stock 1D |
|---|---|---|---|---|
| Component: | | | | |
| Copolymer A | 100 | 100 | 100 | 100 |
| Medium Thermal Black | 20 | 20 | 20 | 20 |
| Hexamethylenediamine carbamate | 1.0 | 1.5 | 1.5 | 1.5 |
| MgO | 20 | 10 | | |
| BaS | | 10 | 20 | |
| CaS | | | | 20 |
| Percent Volume Swell | 140 | 86 | 4.5 | 61.2 |
| Percent Retention $T_B$(25° C.) | 25 | 58 | 78 | 100 |
| Percent Retention $E_B$(25° C.) | 15 | 63 | 95 | 95 |

EXAMPLE 2

Four stocks (2A–2D) were compounded on a rubber roll mill according to the recipes given in Table II. The stocks obtained were cured and aged in hydrochloric acid according to the procedure of Example 1 above. Table II below shows that replacement of magnesium oxide by selected sulfides in the curing recipe results in vulcanizates displaying better resistance toward hot hydrochloric acid.

Table II

| | Stock 2A | Stock 2B | Stock 2C | Stock 2D |
|---|---|---|---|---|
| Component: | | | | |
| Copolymer B | 100 | 100 | 100 | 100 |
| Medium Thermal Black | 20 | 20 | 20 | 20 |
| Hexamethylenediamine carbamate | 1.5 | 1.5 | 1.5 | 1.5 |
| MgO | 15 | 10 | | |
| BaS | | 10 | 20 | |
| CaS | | | | 20 |
| Percent Volume Swell | 181 | 104 | 7.2 | 60 |
| Percent Retention $T_B$(25° C.) | | 45 | 90 | 80 |
| Percent Retention $E_B$(25° C.) | | 48 | 109 | 83 |

EXAMPLE 3

A. Two stocks (3A and 3C) were compounded on a rubber roll mill according to the recipes given in Table III. The stocks obtained were heated in 3 x 6 x ¼" molds under pressure at 150° C. for one hour. They were then removed from the molds and placed in a circulating air oven at 200° C. for 20 hours. Vulcanizate properties are given in Table III.

B. Six stocks (3B, 3D–3H) were compounded on a rubber roll mill according to the recipes given in Table III. The stocks obtained were cured by the procedure of Part A above except that the oven aging period was 18 hours. Vulcanizate properties are given in Table III.

*Table III*

|  | 3A | 3B | 3C | 3D | 3E | 3F | 3G | 3H |
|---|---|---|---|---|---|---|---|---|
| Component: | | | | | | | | |
| Copolymer A | 100 | 100 | 100 | 100 | 100 | | | |
| Copolymer B | | | | | | 100 | 100 | 100 |
| Medium Thermal Black | 20 | 20 | 20 | 20 | 20 | 20 | 20 | 20 |
| Barium Sulfide | 10 | 20 | 30 | | | 20 | | |
| Calcium Sulfide | | | | 20 | | | 20 | |
| Strontium Sulfide | | | | | 20 | | | 20 |
| Hexamethylene-diamine carbamate | 1.0 | 1.5 | 1.5 | 1.5 | 2.0 | 1.5 | 1.5 | 2.0 |
| $M_{200}$ (p.s.i.) at 25° C | 670 | 1,200 | 1,050 | 1,280 | 1,200 | 1,380 | 1,340 | 1,320 |
| Comp. Set (percent) at 70° C | 22 | 28 | 24 | 12 | 20 | 25 | 15 | 25 |

EXAMPLE 4

100 parts by weight of Copolymer A was compounded on a rubber roll mill with 20 parts of medium thermal black, 20 parts of barium sulfide, 0.53 part of dimethyl-dodecylamine, and 1.32 parts of ethylenebisthioglycolate. Stock 4A thereby obtained was cured by the procedure of Part A of Example 3. The vulcanizate exhibited the following stress-strain properties at 25° C.: modulus at 100% extension, 530 lbs./sq. in.; tensile strength, 1350 lbs./sq.in.; extension at the break, 190%.

As many widely different embodiments of this invention may be made without departing from the spirit and scope thereof, it is to be understood that this invention is not limited to the specific embodiments thereof except as defined in the appended claims.

What is claimed is:

1. A process of curing a fluorocarbon elastomer selected from the group consisting of a vinylidene fluoride-hexafluoropropene copolymer and a vinylidene fluoride-hexafluoropropene-tetrafluoroethylene copolymer, which comprises (1) incorporating into each 100 parts by weight of said fluorocarbon elastomer (a) a curing agent selected from the group consisting of about 0.5 to 3.0 parts by weight of the carbamate of a 2 to 6 carbon atom alkylene diamine; about 0.5 to 3.0 parts by weight of an N,N'-diarylidene diamine of the formula

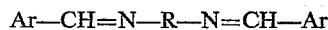

$$Ar\text{---}CH\text{=}N\text{---}R\text{---}N\text{=}CH\text{---}Ar$$

wherein R is a saturated aliphatic or cycloaliphatic hydrocarbon radical of from 4 to 18 carbon atoms and Ar is an aromatic radical of the benzene series; and about 0.2 to 2.0 parts by weight of an organic dithiol in combination with about 0.2 to 1.0 part by weight of an aliphatic tertiary amine, and (b) from about 10 to 30 parts by weight of an inorganic sulfide selected from the group consisting of barium sulfide, calcium sulfide, and strontium sulfide; and (2) heating the mixture thereby obtained at 100° to 200° C. so as to effect a cure.

2. A process according to claim 1 wherein the curing agent is an alkylene diamine carbamate.

3. A process according to claim 2 wherein the curing agent is hexamethylene diamine carbamate.

4. A process according to claim 1 wherein the curing agent is an N,N-diarylidene diamine.

5. A process according to claim 4 wherein the curing agent is N,N'-dicinnamylidene hexamethylene-diamine.

6. A process according to claim 3 wherein the inorganic sulfide is barium sulfide.

7. A process according to claim 5 wherein the inorganic sulfide is barium sulfide.

References Cited in the file of this patent

UNITED STATES PATENTS

| 2,938,881 | Gallagher et al. | May 31, 1960 |
| 2,955,099 | Mallouk et al. | Oct. 4, 1960 |

FOREIGN PATENTS

| 881,582 | Germany | July 2, 1953 |

OTHER REFERENCES

"Rubber World," vol. 140, pages 263–266 (1959).